(12) United States Patent
Lu

(10) Patent No.: US 7,542,102 B2
(45) Date of Patent: Jun. 2, 2009

(54) PIXEL STRUCTURES OF COLOR FILTER SUBSTRATE, ACTIVE DEVICE ARRAY SUBSTRATE AND LIQUID CRYSTAL DISPLAY PANEL

(75) Inventor: An-Hsu Lu, Taoyuan (TW)

(73) Assignee: Au Optronics Corporation, Hsinchu (TW)

( * ) Notice: Subject to any disclaimer, the term of this patent is extended or adjusted under 35 U.S.C. 154(b) by 227 days.

(21) Appl. No.: 11/747,919

(22) Filed: May 14, 2007

(65) Prior Publication Data

US 2008/0111955 A1 May 15, 2008

(30) Foreign Application Priority Data

Nov. 10, 2006 (TW) .............................. 95141635 A (51) Int. Cl.
*G02F 1/136* (2006.01)
(52) U.S. Cl. .............................. 349/45; 349/46; 349/47; 349/48; 349/141; 349/142; 349/106; 349/107; 349/108
(58) Field of Classification Search ............. 349/45–48, 349/106–108
See application file for complete search history.

(56) References Cited

U.S. PATENT DOCUMENTS

2006/0017862 A1 * 1/2006 Song et al. .................... 349/42
2006/0164575 A1 7/2006 Su et al.

FOREIGN PATENT DOCUMENTS

JP 09-179141 7/1997

* cited by examiner

*Primary Examiner*—David Nelms
*Assistant Examiner*—Phu Vu
(74) *Attorney, Agent, or Firm*—Jianq Chyun IP Office (57) ABSTRACT

Pixel structures of a color filter substrate, an active device array substrate and a liquid crystal display panel are provided. The pixel structure of the color filter substrate includes a first and second electrode patterns electrically connected to different voltage input terminals. The pixel structure of the active device array substrate includes a first and second pixel electrodes, a first and second gate-drain capacitances and a first and second storage capacitances. The areas of the first and the second pixel electrodes are different, the first and the second gate-drain capacitances are different, and the first and the second storage capacitances are different. In addition, the pixel structure of the liquid crystal display panel includes the pixel structure of the color filter substrate the pixel structure, the active device array substrate and a liquid crystal layer therebetween.

20 Claims, 6 Drawing Sheets

PIXEL STRUCTURES OF COLOR FILTER SUBSTRATE, ACTIVE DEVICE ARRAY SUBSTRATE AND LIQUID CRYSTAL DISPLAY PANEL

CROSS-REFERENCE TO RELATED APPLICATION

This application claims the priority benefit of Taiwan application serial no. 95141635, filed Nov. 10, 2006. All disclosure of the Taiwan application is incorporated herein by reference.

BACKGROUND OF THE INVENTION

1. Field of the Invention

The present invention relates to a structure of a liquid crystal display, and more particularly to a pixel structures of a color filter substrate, an active device array substrate and a liquid crystal display panel.

2. Description of Related Art

The rapid development of multi-media in our society is mostly the result of a series of breakthroughs in the fabrication of semiconductor devices and display devices. In the past, cathode ray tubes (CRTs) have been the dominant displays in the market due to their good display quality and economy. However, the poor spatial utilization and high power consumption of the CRT often cause many problems. Therefore, thin film transistor liquid crystal displays (TFT LCDs), with the advantages of high display quality, good spatial utilization, low power consumption and radiation-free operation, have gradually become one of the mainstream display products in the market.

In recent years, market pressure forces the development of liquid crystal displays toward higher contrast ratio, more rapid response and wider viewing angle. The request for wider viewing angle also includes removing gray level inversion and color washout problems. At present, the technologies for achieving wide viewing angle in a liquid crystal display include twisted nematic plus wide viewing film (TN+ film) and multi-domain vertical alignment (MVA).

However, regardless of the types of technologies, the disadvantages are complicated processing and low yield. Using the twisted nematic liquid crystal display as an example, because the liquid crystal molecules are directed to the same angle, the viewing angle of the liquid crystal display is narrow. Although the twisted nematic liquid crystal display added wide viewing films can produce better viewing characteristics, the design of the liquid crystal display panel is directly limited by the wide viewing film. For the multi-domain vertical alignment (MVA) liquid crystal display, additional mask processes are needed because protrusions or slits for alignment must be formed on two sides of the liquid crystal layer. Moreover, the protrusions and slits also make it difficult to reduce the thickness of the liquid crystal display panel, and the disadvantages of lower the transmission rate of the back light source and light leakage in a darkened state are also existed. Hence, the cost of producing the liquid crystal display panel is increased while the production yield drops.

SUMMARY OF THE INVENTION

Accordingly, the present invention is directed to pixel structures of a color filter substrate, an active device array substrate and a liquid crystal display panel having wide viewing angle characteristics and resolving complicated processing procedures and low production yield problems.

The present invention provides a pixel structure of a color filter substrate including a color filter pattern, a black matrix, a first electrode pattern and a second electrode pattern. The black matrix is disposed on the substrate to form an area, and the color filter pattern is disposed in the area. The first electrode pattern is disposed over a portion of the color filter pattern and the black matrix. The first electrode pattern is electrically connected to a first voltage input terminal. The second electrode pattern is disposed over another portion of the color filter pattern and the black matrix. The second electrode pattern is electrically connected to the second voltage input terminal. In particular, the input voltage of the second voltage input terminal is different from the input voltage of the first voltage input terminal.

In an embodiment of the present invention, the foregoing black matrix is made from conductive material, a planarization layer is disposed over the substrate to cover the black matrix and the color filter pattern, and the first and second electrode patterns are disposed on the planarization layer. Furthermore, the first electrode pattern may be electrically connected to the black matrix. Therefore, the first electrode pattern is electrically connected to the first voltage input terminal through the black matrix. In addition, the pixel structure of the foregoing color filter substrate may also include a contact window disposed in the planarization layer for electrically connecting the first electrode pattern and the black matrix. On the other hand, the foregoing second electrode pattern is directly connected to the second voltage input terminal.

In an embodiment of the present invention, the foregoing first electrode pattern is directly connected to the first voltage input terminal and the second electrode pattern is directly connected to the second voltage input terminal.

In an embodiment of the present invention, the foregoing color filter pattern covers the edge of the black matrix.

In an embodiment of the present invention, the foregoing black matrix covers the edge of the color filter pattern.

In an embodiment of the present invention, the areas of the first electrode pattern and the second electrode pattern can be different.

In an embodiment of the present invention, the material of the first electrode pattern and the second electrode pattern includes indium tin oxide or indium zinc oxide.

The present invention also provides a pixel structure of an active device array substrate. The pixel structure of the active device array substrate includes a scan line, a data line, a dual-drain thin film transistor, a first pixel electrode, a second pixel electrode, a first common line and a second common line. The scan line and the data line are disposed over a substrate. The dual-drain thin film transistor, disposed over the substrate, includes a gate, a source, a first drain and a second drain. The gate and the scan line are electrically connected and the source and the data line are electrically connected. In addition, a first gate-drain capacitance is existed between the gate and the first drain and a second gate-drain capacitance is existed between the gate and the second drain. Furthermore, the first pixel electrode and the second pixel electrode, disposed over the substrate, are electrically connected to the first drain and the second drain respectively. Moreover, the first common line and the second common line are disposed under the first and the second pixel electrodes respectively. In particular, a first storage capacitance is formed between the first common line and the first pixel electrode, and a second storage capacitance is formed between the second common line and the second pixel electrode. The first and the second gate-drain capacitances are different, and the first and the second storage capacitances are different.

In an embodiment of the present invention, the first drain, the source and the gate constitute a first thin film transistor while the second drain, the source and the gate constitute a second thin film transistor.

In an embodiment of the present invention, the overlapping area between the first drain and the gate is different from the overlapping area between the second drain and the gate.

In an embodiment of the present invention, the overlapping area between the first pixel electrode and the first common line is different from the overlapping area between the second pixel electrode and the common line.

In an embodiment of the present invention, the areas of the first and the second pixel electrodes are different.

The present invention also provides a pixel structure of a liquid crystal display panel. The liquid crystal display panel includes the pixel structure of the color filter substrate, the pixel structure of the active device array substrate and a liquid crystal layer. The pixel structure of the color filter substrate and the pixel structure of the active device array substrate are as above described. The pixel structure of the active device array substrate is disposed on the opposite side of the pixel structure of the color filter substrate. In addition, the liquid crystal layer is disposed between the pixel structure of the active device array substrate and the pixel structure of the color filter substrate.

In an embodiment of the present invention, the foregoing liquid crystal layer comprises nematic liquid crystal molecules.

In the present invention, the viewing angle of the liquid crystal display is enhanced by adjusting the liquid crystal capacitance, the storage capacitance and the gate-drain capacitance. Since there is no need to provide the additional process of fabricating the alignment protrusions or slits, the liquid crystal display can have better production yield and lower production cost. Furthermore, different voltages can be applied to the electrode patterns in a single pixel structure to enhance the viewing angle by designing of the electrode patterns on the color filter substrate.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In order to provide the liquid crystal display with wide viewing angle characteristics, each pixel structure of the color filter substrate, the active device array substrate and the liquid crystal display panel of the present invention is divided into two areas. For the pixel structure of the color filter substrate, the common electrodes in the two areas are electrically connected to different voltage input terminals. For the pixel structure of the active device array substrate, these two areas have different pixel electrode areas, gate-drain capacitances and/or storage capacitances. Therefore, a single pixel structure can align the liquid crystal molecules to two different angles of alignment and increase the viewing angle of the liquid crystal display. In addition, the pixel structure of the liquid crystal display panel can combine the foregoing methods to increase the viewing angle. More specifically, the feed through voltage $V_{FT}$ of a pixel electrode should theoretically satisfy the following formula:

$$V_{FT}=V_{g,P-P} \times C_{gd}/[C_{gd}+C_{sd}+C_{1c}(V_{1c})+C_{sto}] \quad (1)$$

where $V_{g,P-P}$ is the peak-to-peak value of the operating voltage of the gate of the thin film transistor; $C_{gd}$ is the gate-to-drain parasitic capacitance; $C_{sd}$ is the source-to-drain parasitic capacitance; $C_{1c}$ is the liquid crystal capacitance; $V_{1c}$ is the voltage applied to the liquid crystal capacitance, and $C_{1c}$ is a function of $V_{1c}$; and $C_{sto}$ is the storage capacitance. In the present invention, the viewing angle is increased through setting the foregoing parameters (except $C_{sd}$) differently in the two areas. In the following, an embodiment is used to describe these structures in detail.

Figure 1:
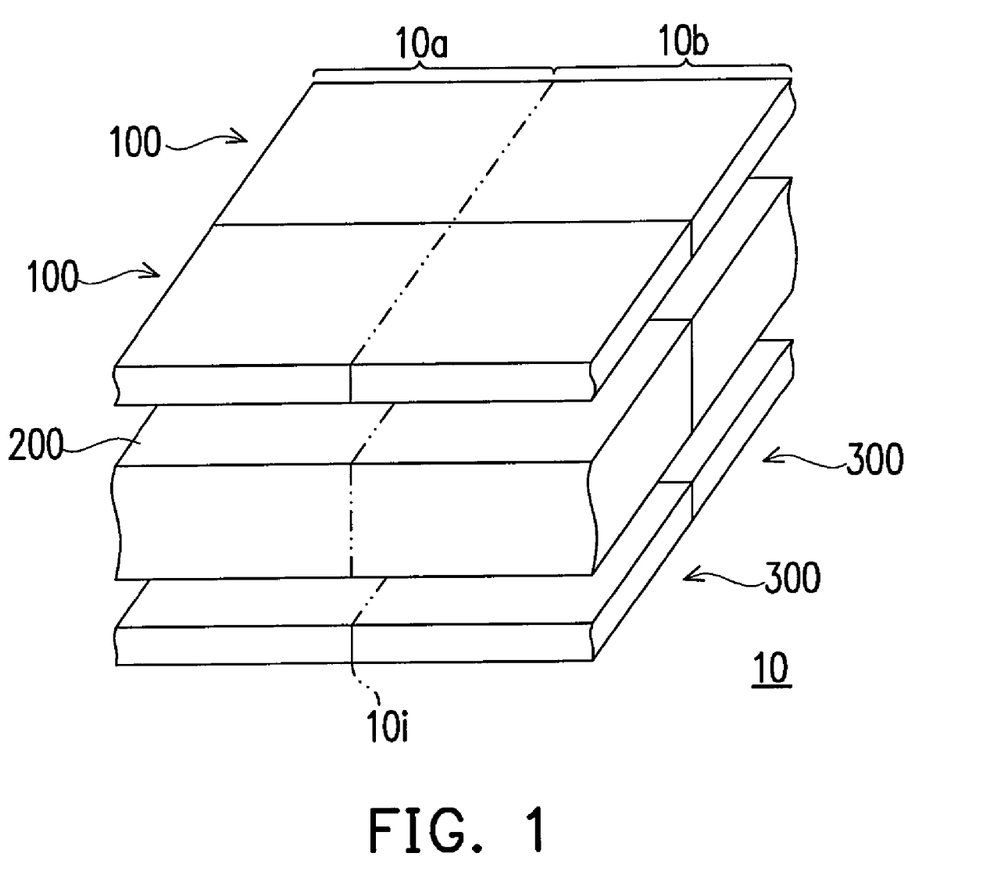
FIG. 1 is an exploded diagram of a pixel structure of a liquid crystal display panel according to an embodiment of the present invention.
Figure 2:
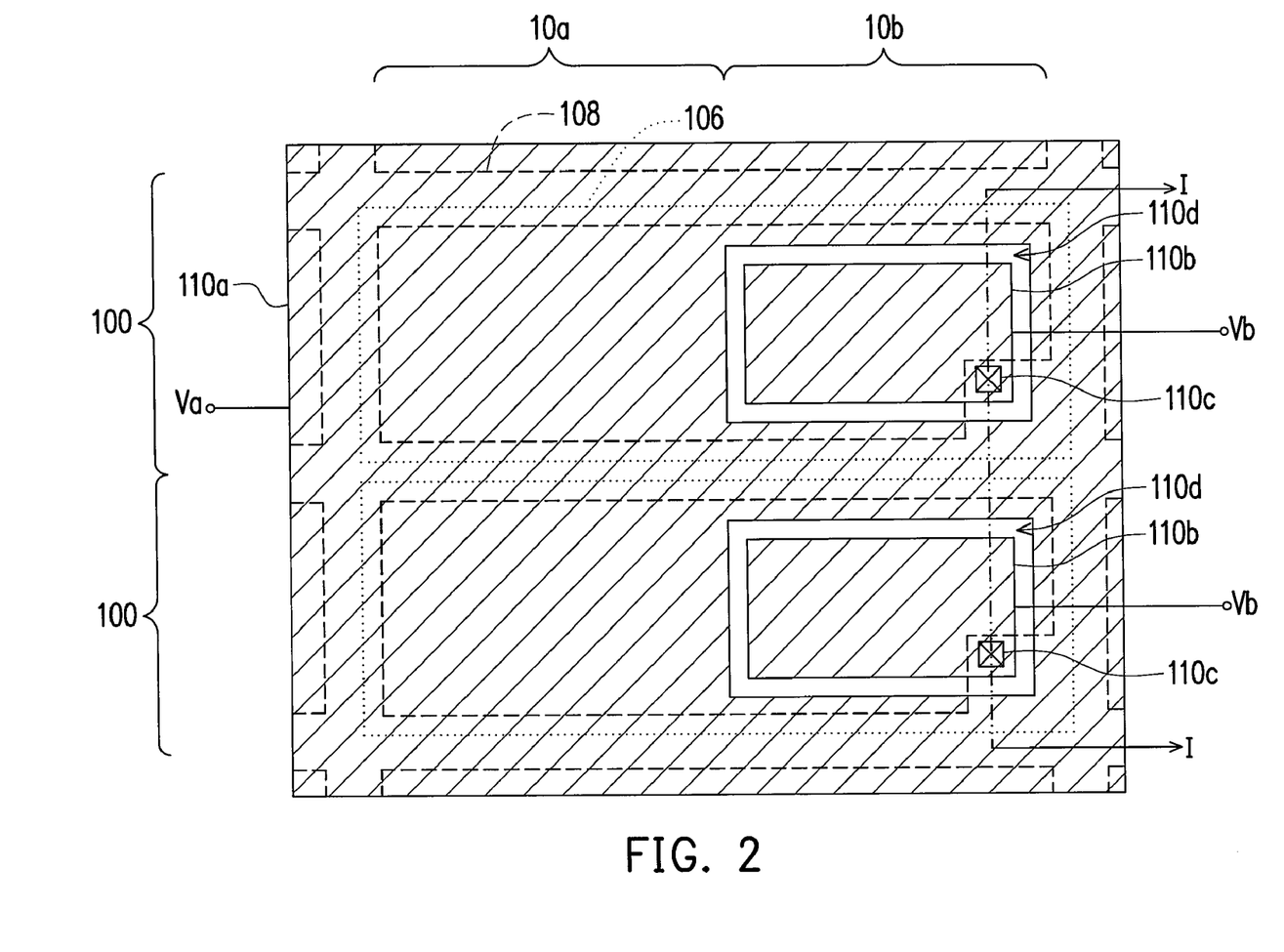
FIG. 2 is a top view of the pixel structure of the color filter substrate in FIG. 1.

FIG. 1 is an exploded diagram of a pixel structure of a liquid crystal display panel according to an embodiment of the present invention. FIG. 2 is a top view of the pixel structure of the color filter substrate in FIG. 1. To simplify the description, both FIG. 1 and FIG. 2 show two pixel structures.

As shown in FIG. 1, the pixel structure 10 of the liquid crystal display panel includes pixel structures 100 of a color filter substrate, a liquid crystal layer 200 and pixel structures 300 of an active device array substrate. The pixel structures 300 of the active device array substrate are disposed opposite to the pixel structures 100 of the color filter substrate. The liquid crystal layer 200 is disposed between the pixel structures 300 of the active device substrate and the pixel structures 100 of the color filter substrate. The liquid crystal layer 200 is a nematic liquid crystal molecule layer, for example. Thus, the liquid crystal display panel 10 can be applied to form in a twisted nematic liquid crystal display (TN-LCD) or a super twisted nematic liquid crystal display (STN-LCD). However, the present invention is not limited in this way. In other words, the present invention can be applied to other types of liquid crystal molecules. In addition, the dash line 10i divides the pixel structure 10 of the liquid crystal display panel into a first area 10a and a second area 10b. It should be noted that the viewing angle is increased by adjusting the disposition of the components in the first area 10a and the second area 10b of the pixel structures 100 of the color filter substrate and the pixel structures 300 of the active device array substrate. However, the applications of the two types of pixel structures are not limited to the pixel structures 10 of a liquid crystal display panel.

In the following, the pixel structure 100 of a color filter substrate is described.

Figure 3:
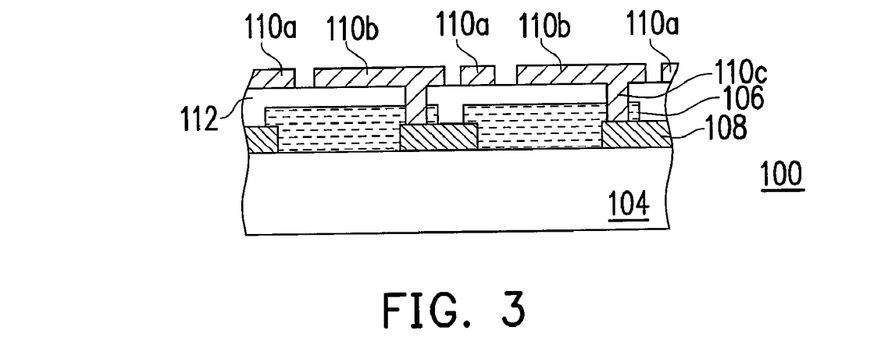
FIG. 3 is a schematic cross-sectional view taken along line I-I of FIG. 2.

FIG. 3 is a schematic cross-sectional view taken along line I-I of FIG. 2. As shown in FIGS. 2 and 3, the pixel structure 100 of the color filter substrate in the present invention includes a substrate 104, a color filter pattern 106, a black matrix 108, a first electrode pattern 110a and a second electrode pattern 110b. The black matrix 108 is disposed on the substrate 104 to form an area, and the color filter pattern 106 is disposed in the area. In one embodiment, the color filter pattern 106 covers a portion of the black matrix 108. The first electrode pattern 110a is disposed over a portion of the color filter pattern 106 and the black matrix 108 and is electrically connected to a first voltage input terminal Va. In addition, a large portion of the first electrode pattern 110a is located in the first area 10a. The second electrode pattern 110b is disposed over another portion of the color filter pattern 106 and the black matrix 108 and is electrically connected to a second voltage input terminal Vb. The second electrode pattern 110b is located in the second area 10b. Furthermore, a trench pattern 110d is disposed between the first electrode pattern 110a and the second electrode pattern 110b to separate them so that the first and the second electrode patterns 110a, 110b can operate at different voltages. In addition, the material of the first electrode pattern 110a and the second electrode pattern 110b includes indium tin oxide or indium zinc oxide, for example. It should be noted that the input voltage at the second voltage input terminal Vb is different from the input voltage at the first input terminal Va. Therefore, when the pixel structure 10 of the liquid crystal display panel is driven, the first electrode pattern 110a and the second electrode pattern 110b in the pixel structure 100 of the color filter substrate are respectively applied with different voltages. As a result, the liquid crystal molecules of the liquid crystal layer 200 within the first area 10a and the second area 10b can have different tilted angles so as to increase the viewing angle of the liquid crystal display.

In addition, the black matrix 108 is made of a conductive material, for example. Furthermore, a planarization layer 112 is disposed over the substrate 104 to cover the color filter pattern 106 and black matrix 108, and the first and second electrode patterns 110a, 110b are disposed on the planarization layer 112. Furthermore, the second electrode pattern 110b can be electrically connected to the black matrix 108 so that it is electrically connected to the second voltage input terminal Vb through the black matrix 108. The planarization layer 112 may further include a contact window 110c for electrically connecting the second electrode pattern 110b with the black matrix 108 as shown in FIG. 3. The first electrode pattern 110a is, for example, directly connected to the first voltage input terminal Va. However, the present invention does not have to be limited in this way. In an embodiment, the second electrode pattern 110b is, for example, directly connected to the second voltage input terminal Vb, while the first electrode pattern 110 is, for example, electrically connected to the first voltage input terminal Va through the black matrix 108.

Figure 4:
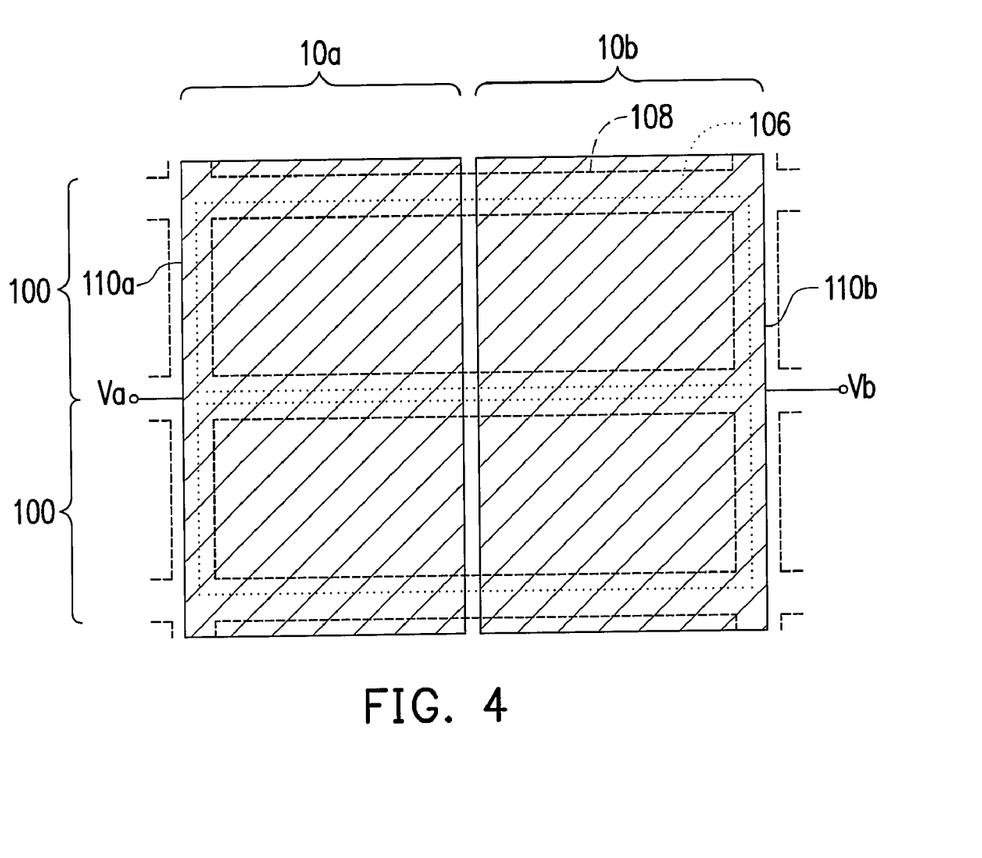
FIG. 4 is a top view of a pixel structure of a color filter substrate according to another embodiment of the present invention.
Figure 5:
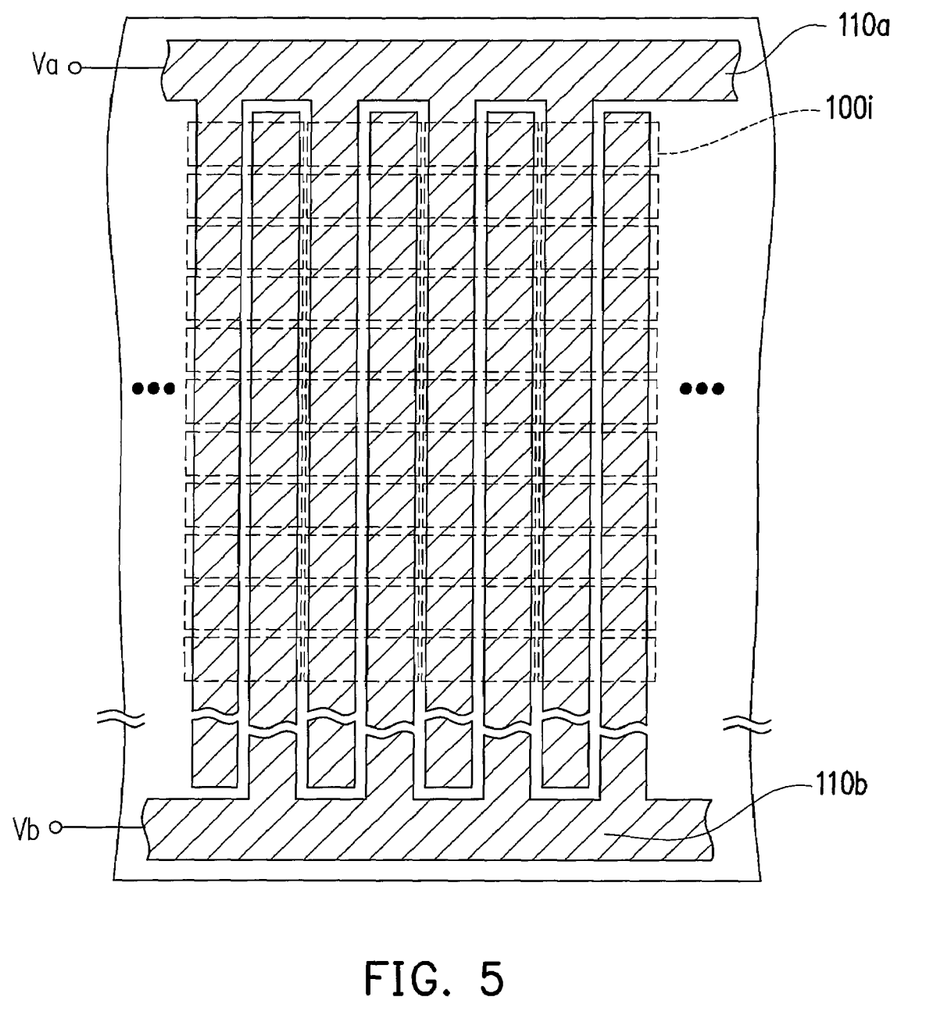
FIG. 5 is a diagram showing a method of disposing a first electrode pattern and a second electrode pattern according to another embodiment of the present invention.

Obviously, the first electrode pattern 110a and the second electrode pattern 110b can be directly electrically connected to the first voltage input terminal Va and the second voltage input terminal Vb respectively without the black matrix 108 as shown in FIG. 4. FIG. 4 is a top view of a pixel structure of a color filter substrate according to another embodiment of the present invention. In the pixel structure 100 of the color filter substrate of FIG. 4, the black matrix 108 can be fabricated from dielectric material so that the contact window is saved. Similarly, the first electrode pattern 110a located in the first area 10a and the second electrode pattern 110b located in the second area 10b are separated from each other. Obviously, there are other method of disposing the first electrode pattern 110a and the second electrode pattern 110b as shown in FIG. 5. FIG. 5 is a diagram showing a method of disposing the first electrode pattern 110a and the second electrode pattern 110b according to another embodiment of the present invention. The dash lines 100i roughly outline the range of each pixel structure 100 of a color filter substrate.

Figure 6:
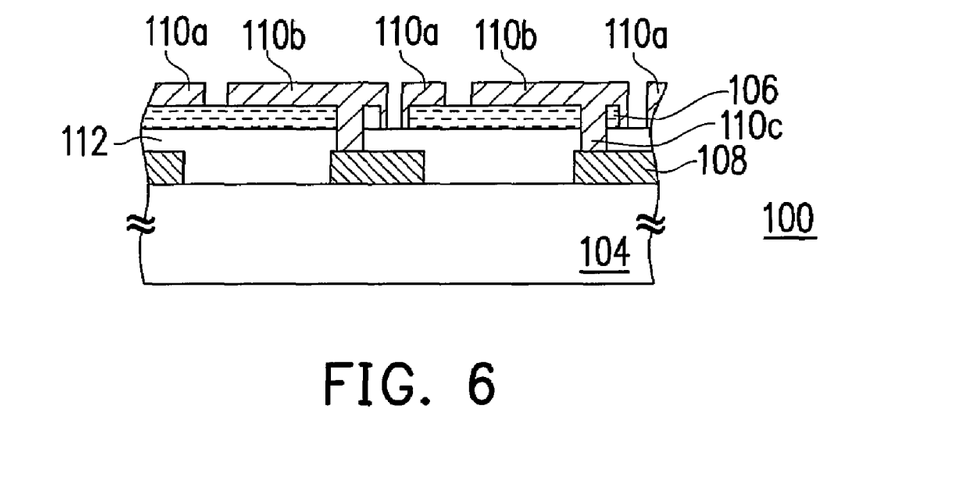
FIGS. 6 and 7 are schematic cross-sectional views showing the pixel structures of two color filter substrates according to another embodiment of the present invention.
Figure 7:
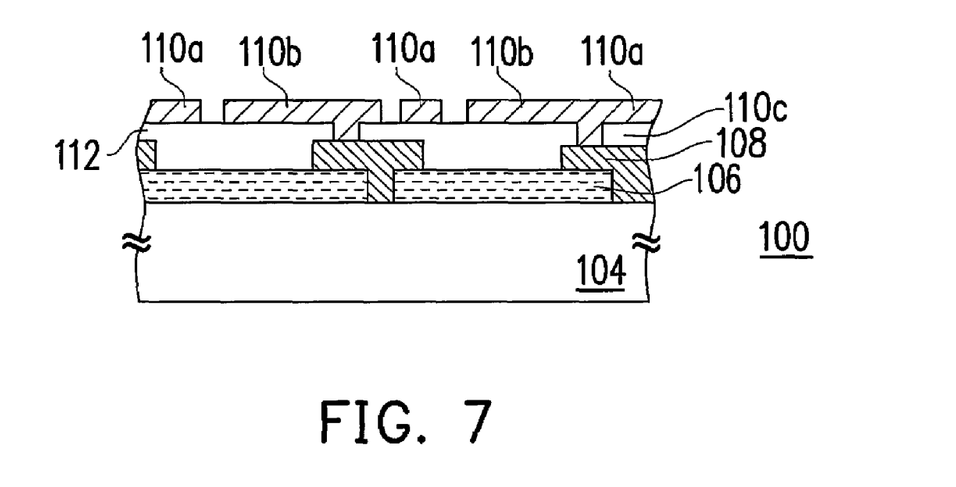

FIGS. 6 and 7 are schematic cross-sectional views showing the pixel structures of two color filter substrates according to another embodiment of the present invention. In the embodiments shown in FIGS. 3 and 6, the color filter pattern 106 may cover the edge of the black matrix 108. However, the present invention is not limited to this disposing method. In other words, the black matrix 108 may cover the edge of the color filter pattern 106 as shown in FIG. 7. If other disposing methods are also considered, the disposition of the color filter pattern 106, the black matrix 108 and the planarization layer 112 can have other variations. For example, in FIG. 3, the black matrix 108, the color filter pattern 106 and the planarization layer 112 are sequentially disposed on the substrate 104. Using FIG. 6 as another example, the black matrix 108, the planarization layer 112 and the color filter pattern 106 are disposed on the substrate 104 in order. Using FIG. 7 as yet another example, the color filter pattern 106, the black matrix 108 and the planarization layer 112 are disposed on the substrate 104 in order.

As mentioned before, the first electrode pattern 110a and the second electrode pattern 110b in the pixel structure 100 of the color filter substrate are applied with different voltages so as to increase the viewing angle of the liquid crystal display. In addition, a first liquid crystal capacitance exists between the first electrode pattern 110a and the pixel electrode (not shown) on the pixel structures 300 of the active device array substrate. Similarly, a second liquid crystal capacitance exists between the second electrode pattern 110b and the pixel electrode on the pixel structures 300 of the active device array substrate. In driving the pixel structure 10 of the liquid crystal display panel, the electric field inside the first and the second liquid capacitances are different because the first electrode pattern 110a and the second electrode pattern 110b have different voltages. Hence, the liquid crystal molecules in the liquid crystal layer 200 have different tilted angles. In another embodiment, the area of the first electrode pattern 110a and the area of the second electrode pattern 110b are different. More specifically, if the areas are different, the first electrode pattern 110a and the second electrode pattern 110b will have different overlapping areas with the foregoing pixel electrodes. Therefore, the difference in the tilted angles between the liquid crystal molecules in the first area 10a and the second area 10b of the liquid crystal layer 200 can be more so as to increase the viewing angle liquid crystal display.

Figure 8:
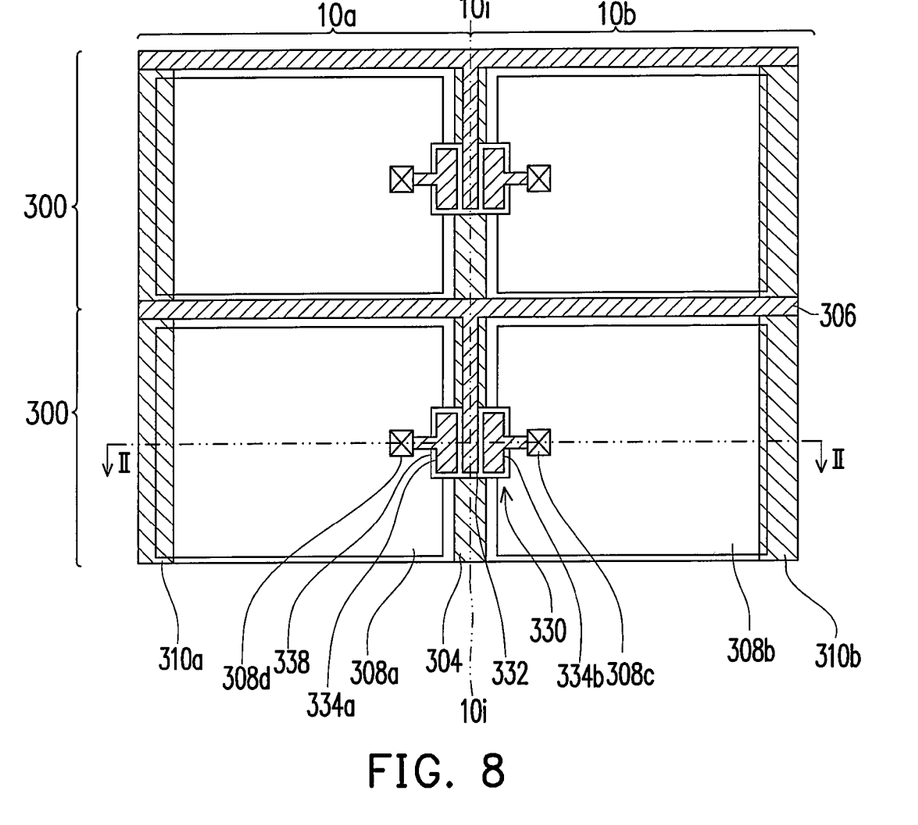
FIG. 8 is a top view of the pixel structure of the active device array substrate of FIG. 1.
Figure 9:
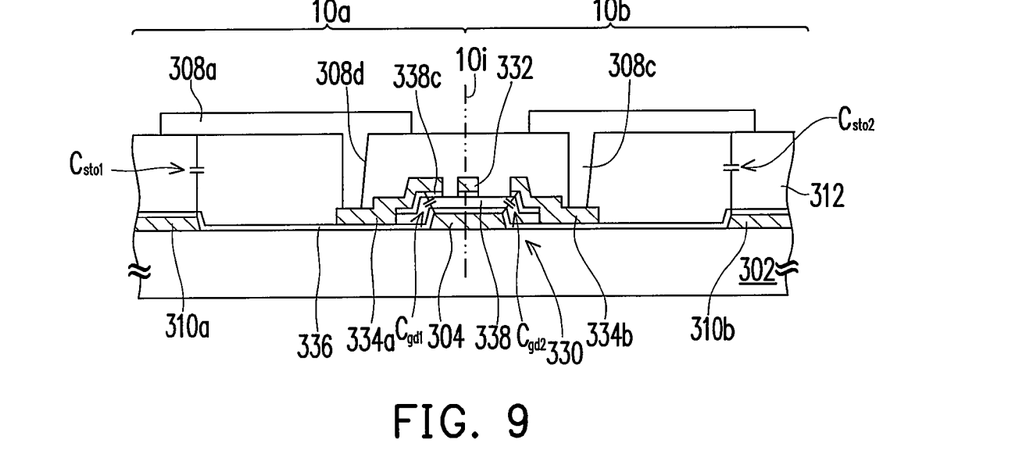
FIG. 9 is a schematic cross-sectional view taken along line II-II of FIG. 8.

Next, the pixel structure 300 of the active device array substrate is described with reference to FIGS. 8 and 9. FIG. 8 is a top view of the pixel structure of the active device array substrate of FIG. 1. FIG. 9 is a schematic cross-sectional view taken along line II-II of FIG. 8.

As shown in FIGS. 8 and 9, the pixel structure 300 of the active device array substrate includes a substrate 302, a scan line 304, a data line 306, a first pixel electrode 308a, a second pixel electrode 308b, a first common line 310a, a second common line 310b and a dual-drain thin film transistor 330.

The scan line 304 and the data line 306 are disposed over the substrate 302. The dual-drain thin film transistor 330 includes a gate, a source 332, a first drain 334a and a second drain 334b. The dual-drain thin film transistor 330 directly uses part of the scan line 304 to serve as the gate, and the source 332 is electrically connected to the data line 306. However, the gate can have other form in another embodiment. Specifically, the first drain 334a, the source 332 and the gate 304 constitute a first thin film transistor 330a, and the second drain 334b, the source 332 and the gate 304 constitute a second thin film transistor 330b. In other words, the first thin film transistor 330a and the second thin film transistor 330b have the mutual gate 304 and the mutual source 332 while the first thin film transistor 330a and the second thin film transistor 330b have the first drain 334a and the second drain 334b, respectively.

In addition, the present embodiment may further include contact windows 308c, 308d, a dielectric layer 312, a gate-insulating layer 336, a semiconductor layer 338 and an ohmic contact layer 338c. In the following, the locations of these components are described. It should be noted that the relationships between the contact widows 308c, 308d, the dielectric layer 312, the gate-insulating layer 336, the semiconductor layer 338, the ohmic contact layer 338c and the various aforementioned components are given only as examples. Hence, it should not be used to limit the scope of the present invention. The scan line 304, the first common line 310a and the second common line 310b are fabricated from the same layer of material disposed evenly on the substrate 302, for example. The gate-insulating layer 336, for example, covers the substrate 302, the scan line 304, the first common line 310a and the second common line 310b. The semiconductor layer 308, for example, covers a portion of the gate-insulating layer 336 and is disposed in the dual-drain thin film transistor 330. The source 332, the first drain 334a and the second drain 334b, for example, are disposed on a portion of the semiconductor layer 338. The first drain 334a and the second drain 334b are disposed in the first area 10a and the second area 10b respectively. In addition, the dielectric layer 312 covers the components over the substrate 302 and the contact windows 308c and 308d are disposed in the dielectric layer 312, for example.

Furthermore, the first pixel electrode 308a and the second pixel electrode 308b are disposed in the first area 10a and the second area 10b, and located on the dielectric layer 312, for example. The first pixel electrode 308a and the second pixel electrode 308b are electrically connected to the first drain 334a and the second drain 334b, for example, electrically connected through the contact windows 308d and 308c. In addition, the first pixel electrode 308a and the second pixel electrode 308b are transparent pixel electrodes, reflective pixel electrodes or one transparent pixel electrode and one reflective pixel electrode. Consequently, the liquid crystal display panel fabricated from the pixel structure 10 can be a transmission liquid crystal display panel, a reflective liquid crystal display panel or a transflective liquid crystal display panel.

In addition, a first gate-drain capacitance $C_{gd1}$ is existed between the gate and the first drain 334a and a second gate-drain capacitance $C_{gd2}$ is existed between the gate and the second drain 334b. More specifically, in the present embodiment, a parasitic capacitance is existed in the overlapping area between the scan line 304 and the first drain 334a, that is the first gate-drain capacitance $C_{gd1}$. Similarly, another parasitic capacitance is existed in the overlapping area between the scan line 304 and the second drain 334b in the present embodiment, and that is the second gate-drain capacitance $C_{gd2}$.

Furthermore, the first common line 310a and the second common line 310b are disposed under the first pixel electrode 380a and the second pixel electrode 308b respectively. Therefore, a first storage capacitance $C_{sto1}$ is existed between the first common line 310a and the first pixel electrode 308a and a second storage capacitance $C_{sto2}$ is existed between the second common line 310b and the second pixel electrode 308b. More specifically, a first storage capacitance $C_{sto1}$ is existed between the first common line 310a and the first pixel electrode 308a. Similarly, a second storage capacitance $C_{sto2}$ is existed between the second common line 310b and the second pixel electrode 308b.

The pixel structure 300 of the active device array substrate in the present invention has to satisfy at least two conditions, namely, (a) the first gate-drain capacitance $C_{gd1}$ and the second gate-drain capacitance $C_{gd2}$ are different, and (b) the first storage capacitance $C_{sto1}$ and the second storage capacitance $C_{sto2}$ are different. In another embodiment, besides the two aforementioned conditions, the pixel structure 300 of the active device array substrate also has to satisfy another condition, (c) the areas of the first pixel electrode 308a and the second pixel electrode 308b are different. Hence, the viewing angle of the liquid crystal display is increased. More specifically, as shown in FIGS. 8 and 9, a first liquid crystal capacitance is existed between the first pixel electrode 308a and the first electrode pattern 110a, and a second liquid crystal capacitance is existed between the second pixel electrode 308b and the second electrode pattern 110b. When the condition (a) that the first gate-drain capacitance $C_{gd1}$ and the second gate-drain capacitance $C_{gd2}$ are different and the condition (b) that the first storage capacitance $C_{sto1}$ and the second storage capacitance $C_{sto2}$ are different are both satisfied, the liquid crystal capacitance will affect the feed through voltage of the pixel electrode through the formula (1). Therefore, in driving the pixel structure, the first pixel electrode 308a and the second pixel electrode 308b will have different voltages. As a result, the liquid crystal molecules in the first area 10a and the second area 10b of the liquid crystal layer 200 have different tilted angles to increase the viewing angle. Similarly, when the condition (c) that the first pixel electrode 308a and the second pixel electrode 308b having different areas is also satisfied, the first liquid crystal capacitance and the second liquid crystal capacitance will be different. Consequently, the liquid crystal molecules in the first area 10a and the second area 10b of the liquid crystal layer 200 have different tilted angles to increase the viewing angle.

As shown in FIGS. 8 and 9, one method of realizing the condition (a) that the first gate-drain capacitance $C_{gd1}$ and the second gate-drain capacitance $C_{gd2}$ are different is, for example, to make the overlapping area between the first drain 334a and the gate (the scan line 304) and the overlapping area between the second drain 334b and the gate different. In the present embodiment, the overlapping area between the first drain 334a and the gate is larger while the overlapping area between the second drain 334b and the gate is smaller. However, the present invention does not have to be limited in the way. More specifically, the method of realization also includes making the gate-insulating layer 336 in the first area 10a and the second area 10b having different dielectric constants or different thickness. Similarly, one method of realizing the condition (b) that the first storage capacitance $C_{sto1}$ and the second storage capacitance $C_{sto2}$ are different is, for example, to make the overlapping area between the first pixel electrode 308a and the first common line 310a and the overlapping area between the second pixel electrode 308b and the second common line 310b different. Other method of realization includes making the dielectric layer 312 in the first area 10a and the second area 10b having different dielectric constants or different thickness.

It should be noted that the present embodiment adjusts the area of the second pixel electrode 308b on the common line 310b. Therefore, besides making the capacitance of the first liquid capacitance different from the capacitance of the second liquid capacitance, the first storage capacitance $C_{sto1}$ and the second storage capacitance $C_{sto2}$ are rendered different from each other as well. Thus, the pixel structure 300 of the active device array substrate is able to simultaneously satisfy the condition (c) the first pixel electrode 308a and the second pixel electrode 208b having different areas and (b) the first storage capacitance $C_{sto1}$ and the second storage capacitance $C_{sto2}$ are different. However, the present invention does not have to be limited in this way. In other embodiments, the pixel structure 300 of the active device array substrate may satisfy just two or one of the three conditions, namely, (c) the first pixel electrode 308a and the second pixel electrode 308b having different areas, (a) the first gate-drain capacitance $C_{gd1}$ and the second gate-drain capacitance $C_{gd2}$ are different, and (b) the first storage capacitance $C_{sto1}$ and the second storage capacitance $C_{sto2}$ are different.

In summary, the pixel structures in the present invention increases the viewing angle of a liquid crystal display through adjusting the liquid crystal capacitance, storage capacitance and the gate-drain capacitance. There is no need to perform additional processes for producing alignment protrusions or slits. Hence, the liquid crystal display can have a higher yield and a lower production cost. In addition, because the pixel structure of the color filter substrate is not limited by the specification of the wide viewing film, it can have a greater degree of design freedom. Furthermore, because different input voltages are used to adjust the voltages of the first electrode pattern and the second electrode pattern, viewing angle properties can be adjusted so as to compensate for any possible mura problem after the process of fabricating the color filter substrate is complete.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure of a color filter substrate, comprising:
    a black matrix disposed on a substrate to form an area;
    a color filter pattern disposed in the area;
    a first electrode pattern disposed over a portion of the color filter pattern and the black matrix, wherein the first electrode pattern is electrically connected to a first voltage input terminal; and
    a second electrode pattern disposed over another portion of the color filter pattern and the black matrix, wherein the second electrode pattern is electrically connected to a second voltage input terminal, and the input voltage of the second voltage input terminal is different from the input voltage of the first voltage input terminal.

2. The pixel structure of the color filter substrate of claim 1, further comprising a planarization layer disposed over the substrate to cover the black matrix and the color filter pattern, wherein the first and second electrode patterns are disposed on the planarization layer, and the black matrix comprises a conductive material.

3. The pixel structure of the color filter substrate of claim 2, wherein the first electrode pattern is electrically connected to the black matrix, and the first electrode pattern is electrically connected to the first voltage input terminal through the black matrix.

4. The pixel structure of the color filter substrate of claim 3, further comprising a contact window disposed in the planarization layer for electrically connecting the first electrode pattern and the black matrix.

5. The pixel structure of the color filter substrate of claim 3, wherein the second electrode pattern is directly connected to the second voltage input terminal.

6. The pixel structure of the color filter substrate of claim 1, wherein the first electrode pattern is directly connected to the first voltage input terminal and the second electrode pattern is directly connected to the second voltage input terminal.

7. The pixel structure of the color filter substrate of claim 1, wherein the color filter pattern covers an edge of the black matrix.

8. The pixel structure of the color filter substrate of claim 1, wherein the black matrix covers an edge of the color filter pattern.

9. The pixel structure of the color filter substrate of claim 1, wherein the area of the first electrode pattern is different from the area of the second electrode pattern.

10. The pixel structure of the color filter substrate of claim 1, wherein the material of the first electrode pattern and the second electrode pattern comprises indium tin oxide or indium zinc oxide.

11. A pixel structure of an active device array substrate, comprising:
    a scan line and a data line both disposed over a substrate;
    a dual-drain thin film transistor, having a gate, a source, a first drain and a second drain, disposed over the substrate, wherein the gate and the scan line are electrically connected and the source and the data line are electrically connected, a gate-drain capacitance is formed between the gate and the first drain, and a second gate-drain capacitance is formed between the gate and the second drain;
    a first pixel electrode and a second pixel electrode formed over the substrate and electrically connected to the first drain and the second drain, respectively; and
    a first common line and a second common line, disposed under the first and the second pixel electrodes respectively, wherein a first storage capacitance is formed between the first common line and the first pixel electrode, a second storage capacitance is formed between the second common line and the second pixel electrode, and the first and the second gate-drain capacitances are different and the first and the second storage capacitances are different.

12. The pixel structure of the active device array substrate of claim 11, wherein an overlapping area between the first drain and the gate is different from an overlapping area between the second drain and the gate.

13. The pixel structure of the active device array substrate of claim 11, wherein an overlapping area between the first pixel electrode and the first common line is different from an overlapping area between the second pixel electrode and the second common line.

14. The pixel structure of the active device array substrate of claim 11, wherein the areas of the first and the second pixel electrodes are different.

15. A pixel structure of a liquid crystal display panel, comprising:
   a pixel structure of a color filter substrate as claimed in claim 1;
   a pixel structure of an active device array substrate as claimed in claim 11, wherein the pixel structure of the active device array substrate is disposed on an opposing side of the pixel structure of the color filter substrate; and
   a liquid crystal layer interposed between the pixel structure of the active device array substrate and the pixel structure of the color filter substrate.

16. The pixel structure of the liquid crystal display panel of claim 15, wherein the liquid crystal layer comprises nematic liquid crystal molecules.

17. A pixel structure of an active device array substrate, comprising:
   a scan line and a data line both disposed over a substrate;
   a dual-drain thin film transistor, having a gate, a source, a first drain and a second drain, disposed over the substrate, wherein the gate and the scan line are electrically connected and the source and the data line are electrically connected, the first drain, the source and the gate constitute a first thin film transistor and the second drain, the source and the gate constitute a second thin film transistor, a gate-drain capacitance is formed between the gate and the first drain, and a second gate-drain capacitance is formed between the gate and the second drain;
   a first pixel electrode and a second pixel electrode formed over the substrate and electrically connected to the first drain and the second drain, respectively; and
   a first common line and a second common line, disposed under the first and the second pixel electrodes respectively, wherein a first storage capacitance is formed between the first common line and the first pixel electrode, a second storage capacitance is formed between the second common line and the second pixel electrode, and the first and the second gate-drain capacitances are different and the first and the second storage capacitances are different.

18. The pixel structure of the active device array substrate of claim 17, wherein an overlapping area between the first drain and the gate is different from an overlapping area between the second drain and the gate.

19. The pixel structure of the active device array substrate of claim 17, wherein an overlapping area between the first pixel electrode and the first common line is different from an overlapping area between the second pixel electrode and the second common line.

20. The pixel structure of the active device array substrate of claim 17, wherein the areas of the first and the second pixel electrodes are different.

* * * * *